United States Patent [19]

Crunkelton

[11] Patent Number: 5,161,358
[45] Date of Patent: Nov. 10, 1992

[54] MECHANICAL CITRUS AND OTHER FRUIT PICKER

[76] Inventor: William S. Crunkelton, 306 N. Ruth Rd., Avon Park, Fla. 33825

[21] Appl. No.: 726,702

[22] Filed: Jul. 8, 1991

[51] Int. Cl.$^5$ ............................................. A01D 46/24
[52] U.S. Cl. ...................................... 56/328.1; 56/330
[58] Field of Search ...................... 56/328.1, 330, 332, 56/333, 339

[56] References Cited

U.S. PATENT DOCUMENTS

| | | | |
|---|---|---|---|
| 3,380,235 | 4/1968 | Smith et al. | 56/328.1 |
| 3,417,558 | 12/1968 | Granger | 56/328.1 |
| 3,827,221 | 8/1974 | Chen | 56/328.1 |
| 4,163,356 | 8/1979 | Robbins et al. | 56/328.1 |

*Primary Examiner*—Terry Lee Melius

[57] ABSTRACT

A mechanical citrus and other fruit picking apparatus is defined with an improved method of picking fruit, using finger assemblies with tension producing and tension reducing abilities, with finger members protruding at intervals from sides of tubular arms. Arms are mounted on metal base frame that can be attached to various types of tractors or other propelling equipment. As arms of apparatus enter through limbs and foliage into tree, said fingers depress, then reposition to correct angle for picking fruit. Any said arm retracts upon any impact with larger limb. As apparatus is withdrawn from tree, said fingers engage stems of fruit, bringing fruit up into intersection of said arm and said finger, whereby pressure of said finger against stem causes separation of fruit from stem. During the backward motion, smaller limbs and leaves are pulled up and over the special shaping and slippery surface of said finger. The tension reduction device allows said finger to slip over larger limbs.

4 Claims, 3 Drawing Sheets

MECHANICAL CITRUS AND OTHER FRUIT PICKER

FIELD OF THE INVENTION

This invention relates to apparatus for picking fruit from trees; more particularly it pertains to apparatus for engaging stems of fruit while exiting tree, thereby pulling or picking fruit for harvesting.

BACKGROUND OF THE INVENTION

For over one hundred years there have been efforts to produce a citrus and other fruit picking machine that would alleviate the time consuming process and prohibitive expense of hand picking fruit. Another major factor involved in such efforts is that frequently sufficient manual labor is not readily available.

The fruit picking machines presently available are unsatisfactory for wide spread use, because of low volume picking or potential damage to trees by shakers, resulting from their action of gripping the trunk or a major branch of tree and violently shaking said tree to dislodge the fruit.

SUMMARY OF THE INVENTION

The present invention specifically addresses and satisfies the above referenced need in the art of providing a fruit picking device which can be mounted on various types of equipment, and can be easily propelled into a fruit tree and pick fruit while being withdrawn from tree, without causing damage to the fruit or permanent damage to the tree.

DETAILED DESCRIPTION OF DRAWINGS

Figure 3:
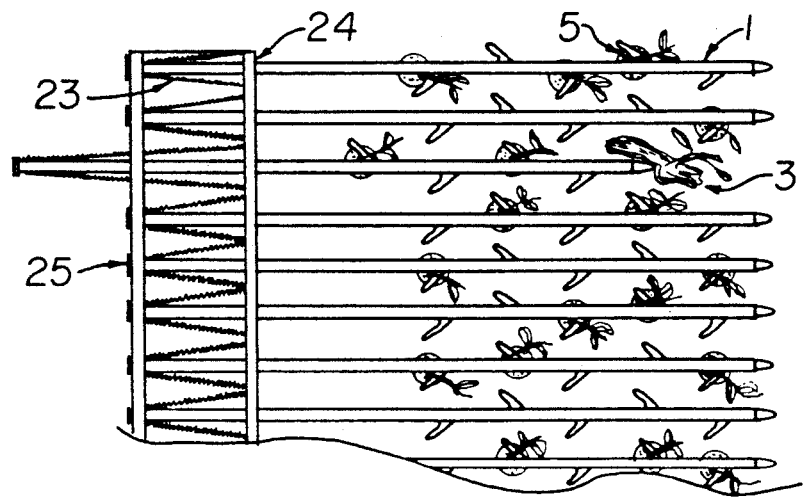
FIG. 3 is a top view of arms, with fingers, in typical arm spacing position within base frame, and showing how fruit is caught by finger. Also, showing how arm retracts from impact with larger limb.

Refering to the drawings for a mechanical fruit picking apparatus. Refering first more particularly to FIG. 1 arms 1 are made of slender square metal tubing with tips 2 at front end of arms. Said tips 2 being tapered with rounded points 3 that allow easy penetration into foliage and deflection of most limbs. FIG. 3 shows upon the rare occasion of point 3 lodging solidly against larger limb, arm retracts within openings in base frame 24. A spring 23 mounted on each side at rear end of arm and connected to front of frame 24, will cause arm to return to original position where plate 25 on rear end of arm 1 will cause arm to stop. Arms are sloted 26 on each side, at intervals, to receive finger assemblies, as shown in FIG. 1.

As apparatus is propelled into tree, fingers 4, upon contact with limb or foliage, depress 22 (See FIG. 2) thus insuring unobstructed insertion into tree. Whereupon said fingers reposition themselves, with aid of elastic repositioning band 18, to correct angle for engaging stems of fruit. Said elastic positioning band 18 is connected to top of finger 19 by wire swivel clip 20 and is fastened into arm 1 with pin 21 shown in FIG. 1.

Figure 1:
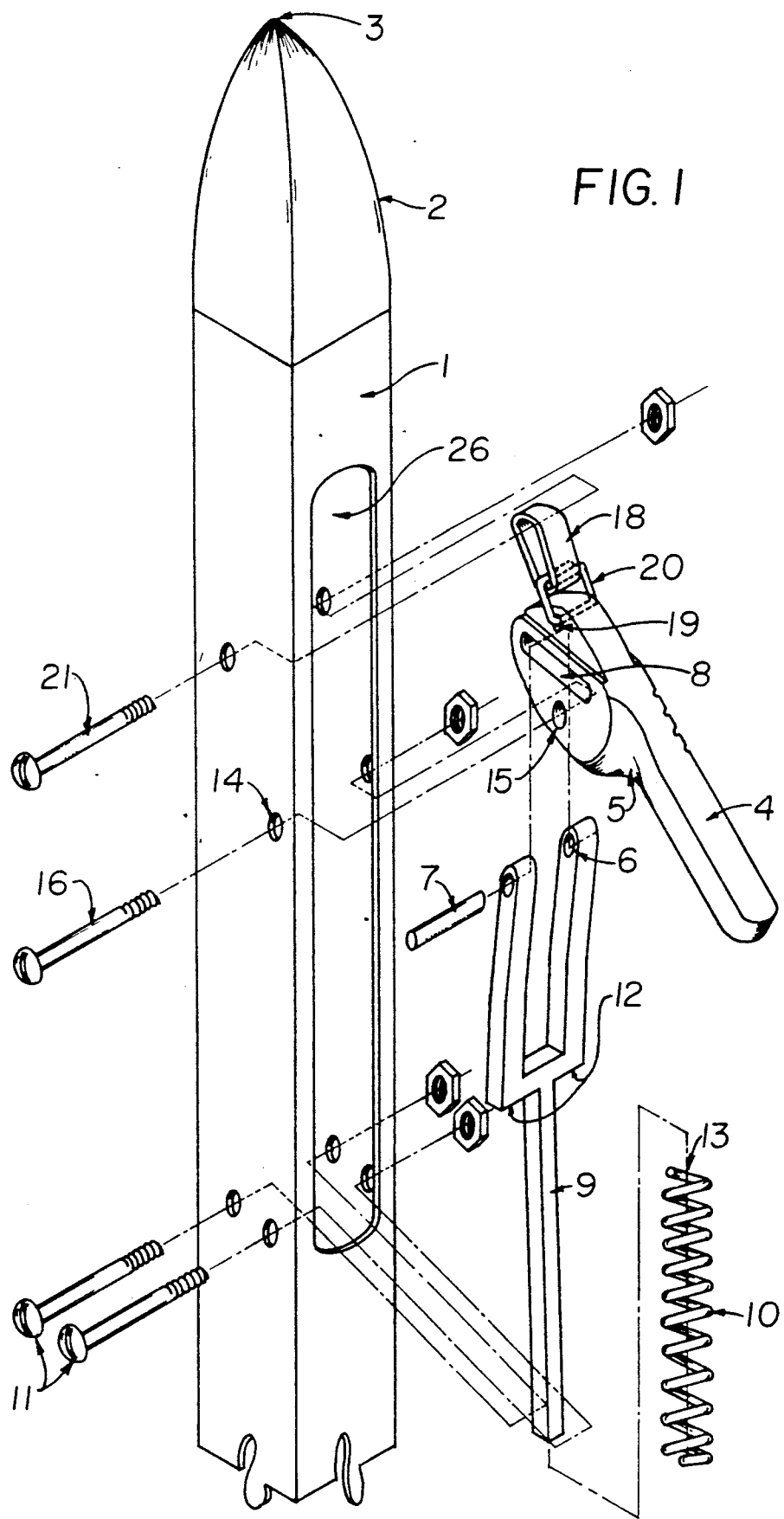
FIG. 1 is an exploded isometric view of an arm section with a "right hand" finger assembly. Note: "Left hand" finger will be mirror image of "right hand" finger.

Refering now to FIG. 1 and 3, Finger 4 is made of Delrin plastic (or equal) or polished metal so as to have a slippery surface; and is shaped in such a way that said finger will catch the stems of fruit, bringing stem into curve 5 of finger, pull stem up and over finger, and bring fruit underneath intersection of finger and arm, thus holding fruit until force against stem, created by apparatus exiting tree, separates said fruit from tree. The slippery surface and curve 5 of finger also allows small limbs and leaves to slide over said finger with little or no damage to said limbs or leaves.

Figure 2:
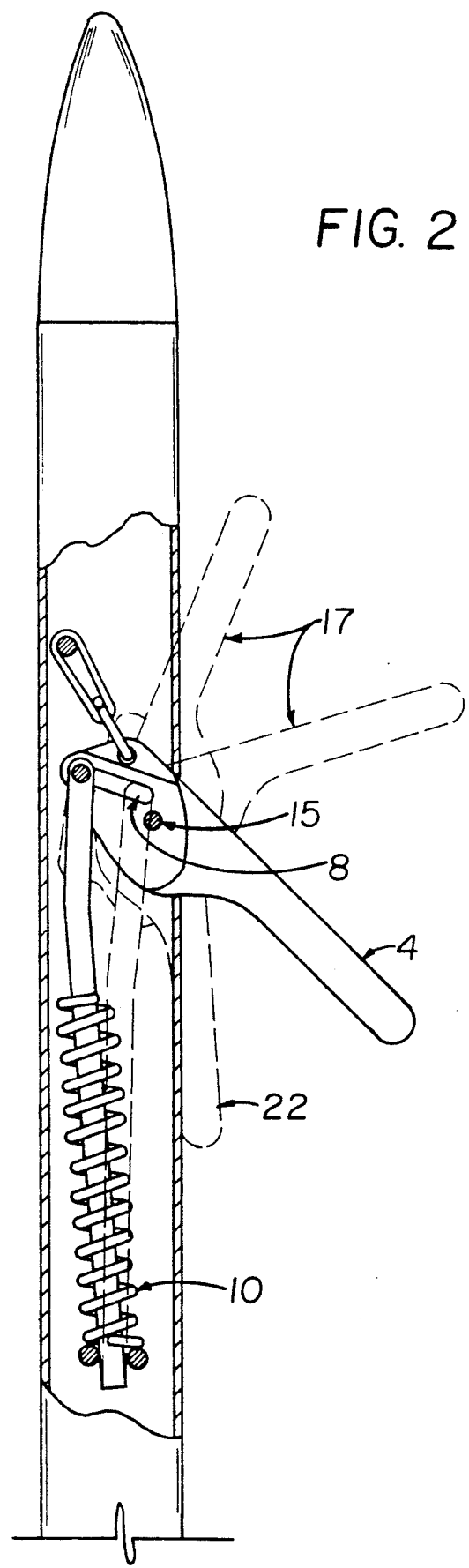
FIG. 2 is a cutaway action view of an arm section with finger assembly in place and reaction of finger upon entering or exiting tree.

FIG. 1 and 2 shows finger 4 is connected to yoke 6 by means of pin 7 through slot 8 in finger. Shank 9 of yoke inserted through compression spring 10 and through spring holding pins 11, with shoulders 12 of yoke resting on top 13 of compression spring. Finger is fastened 14 at pivot point 15 of said finger with pin 16. Compression spring 10 is strong enough to allow finger to pick fruit, but as finger starts to pull over any impeding limb, it changes the angle 17 of said finger, and yoke pin 7 slips forward in slot 8 closer to pivot point 15 in finger, thus changing leverage and creating less compression in spring 10. This reduction in tension allows finger to easily slip over limb but still has enough tension to snap finger back into position for picking fruit.

Figure 4:
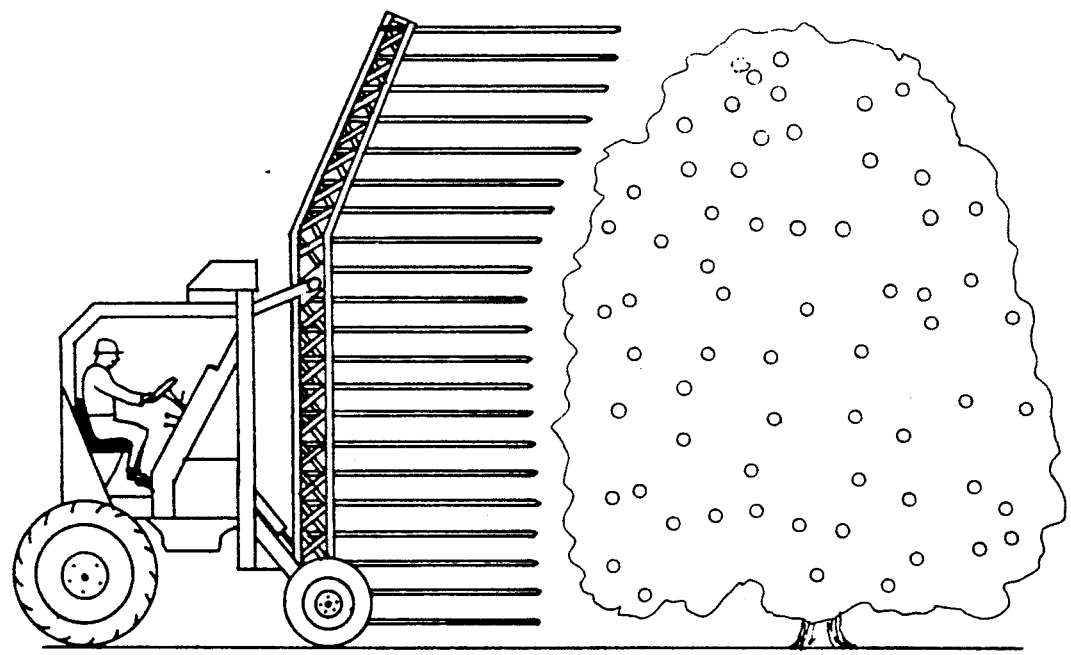
FIG. 4 is a side view indicating the use of a fruit picking apparatus according to this invention for picking a citrus tree.

FIG. 4 illustrates one possible mounting position of fruit picking apparatus on propelling equipment and example of one type of tractor that can be used as propelling equipment.

The use of different types of tractors, fork lifts, end loaders, boom type equipment, or hydraulic or mechanical extensions from trailers, trucks, or other equipment can be used. Also, one or more arms with fingers can be inserted into tree and pulled out of said tree by hand. All these and other methods can be used with this invention to pick fruit.

Positioning spring can be used in place of elastic positioning band.

The foregoing description and drawings of the invention are explanatory and illustrative only, therefore those skilled in the art will recognize that modifications as to shape, materials, sizes and arrangements of parts may be made without departing from the true spirit of the invention.

What is claimed is:

1. A fruit picking apparatus comprising:
   a metal base frame mounted on a propelling device,
   a plurality of tubular arms resiliently mounted in a forward direction on said metal base frame at an original position for insertion into a fruit bearing plant or tree,
   resilient means for allowing retraction in a rearward direction of each of said tubular arms upon contact of an arm with a large limb of said plant or tree,
   stop means on said frame for stopping each said arm at the original position when returned by the resilient means from the retracted position and
   at least one finger assembly mounted within recesses on each said arm, said at least one finger assembly including:
   a finger member extending beyond said recess into a picking position, adjustable tension means for maintaining or reducing the tension applied to said finger member, means for allowing the finger member to be depressed into the recess and means for holding the finger member when engaging a piece of fruit for separating the piece of fruit from the plant or tree.

2. The fruit picking apparatus according to claim 1, wherein said at least one finger assembly further includes:
 said finger member having a curved shape and a slippery surface.

3. The fruit picking apparatus according to claim 1, wherein said adjustable tension means include:
 a biased pivotable lever assembly mounted within the recess.

4. The fruit picking apparatus according to claim 1, wherein said resilient means consists of a spring.

* * * * *